US006679488B2

(12) United States Patent
Breitlow-Hertzfeldt et al.

(10) Patent No.: US 6,679,488 B2
(45) Date of Patent: Jan. 20, 2004

(54) ARMATURE SPRING FOR A RELAY

(75) Inventors: Juergen Breitlow-Hertzfeldt, Berlin (DE); Martin Hanke, Berlin (DE); Ralf Hoffmann, Berlin (DE)

(73) Assignee: Tyco Electronics AMP GmbH, Bensheim (DE)

( * ) Notice: Subject to any disclaimer, the term of this patent is extended or adjusted under 35 U.S.C. 154(b) by 44 days.

(21) Appl. No.: 09/847,785

(22) Filed: May 2, 2001

(65) Prior Publication Data

US 2002/0008600 A1 Jan. 24, 2002

(30) Foreign Application Priority Data

May 8, 2000 (EP) ........................................... 00109694

(51) Int. Cl.$^7$ .................................................. F16F 1/18

(52) U.S. Cl. ......................................... 267/158; 335/78

(58) Field of Search ................................ 267/158, 273, 267/41, 36.1, 25, 182; 335/128, 78, 151, 274

(56) References Cited

U.S. PATENT DOCUMENTS 4,346,359 A * 8/1982 Pirner et al. ................ 335/128
4,670,727 A * 6/1987 Muller et al. ............... 335/274
5,155,458 A * 10/1992 Gamble ....................... 335/78
5,534,834 A * 7/1996 Hendel ........................ 335/78
5,627,503 A * 5/1997 Mader ......................... 335/78
5,689,222 A * 11/1997 Schneider et al. ............ 335/78
5,894,253 A * 4/1999 Ichikawa et al. ............. 335/78
5,900,791 A * 5/1999 Hoffmann et al. .......... 335/128
6,266,867 B1 * 7/2001 Kern .......................... 335/151

FOREIGN PATENT DOCUMENTS

EP 0 707 331 A1 4/1996 .......... H01H/50/26

* cited by examiner

*Primary Examiner*—Christopher P. Schwartz
*Assistant Examiner*—Melanie Torres

(57) ABSTRACT

The present invention relates to an armature spring (4) for a relay comprising a fastening section (3), a connected oblong spring section and a lever (7). The lever is located on the side of the longitudinal axis of the spring section opposite to that of the fastening section (3) so that the spring section is subject to torsional stress. Due to the torsional stress of the spring section, an even progression of the spring characteristic curve can be achieved. The stress is very even, so that the spring is very small and simple. In advantageous embodiments, the spring section extends parallel to the armature pivot axis and is formed by a torsion web (6). The lever section can be flexibly deformable. As a result the spring characteristic can be particularly easily and flexibly adjusted. As a result the spring armature can be combined with a magnet system exhibiting opening angles of 10° to 15°.

10 Claims, 2 Drawing Sheets

ARMATURE SPRING FOR A RELAY

BACKGROUND OF THE INVENTION

The present invention relates to an armature spring for a relay having a fastening section with which the armature spring can be fastened to an armature or a thrust bearing, an oblong spring section which is connected at a first end with the fastening section, as well as a lever adjacent to the spring section and comprising a support area for supporting the lever on a thrust bearing or an armature.

DESCRIPTION OF THE PRIOR ART

Armature springs generally accomplish several tasks. The armature into an open position and they urge the armature against an armature bearing, so that an armature pivot axis is achieved. They can also ensure that an opening force can be exerted with a contact pair connected to the armature via a contact spring.

EP 0707331 A1 describes an armature spring of the aforementioned type, arranged in the form of a beam fixed at both ends. The middle of the beam comprises a projection which engages into a recess of an armature. The armature spring and the recess in the armature are thereby positioned such that the armature is biased into an open position. During the closing of the armature the armature spring is subject to bending stress. An arrangement of this type, however, is not suitable for armatures with a high rotary angle. Furthermore, the restoring force of this known armature spring is minimal and in many cases insufficient.

In addition, torsion springs are known as armature springs having spiral torsion springs. These known springs present the disadvantage that they require significant construction space, with nonetheless the area next to the spring remaining unused, contradicting efforts to achieve miniturization and a compact design.

SUMMARY OF THE INVENTION

It is an object of the present invention to provide an armature spring, which not only biases the armature but also pushes the latter against a bearing, and which is suitable for a high armature rotary angle and is nevertheless characterised by compact dimensions.

According to the invention, this and other objects are realised by an armature spring of the aforementioned type, characterised in that the support area and the fastening sections are located on opposite sides of the longitudinal axis of the spring section such that during movement of the armature, the spring section is subject primarily to torsional stress.

These armature springs obtain the required force not through elastic bending strain but through torsion. Due to the fact that the support area is located on the longitudinal axis side of the spring section opposite the fastening sections, the amount of bending stress during the stressing of the spring section is significantly reduced and the amount of transverse stress (torsion) is significantly elevated. The advantage of the torsionally stressed spring section is that the stress is evenly distributed over the length of the spring section. This means that, despite high force and low spring rates, mechanical tensions can be kept relatively low. This in turn enables the armature spring to be designed in geometric dimensions which are smaller than in traditional springs. Due to this solution, the existing construction space of a preset geometry can be optimally used. In the case of a preset maximum available construction space, particularly high armature restoring forces can thus be realised.

An embodiment combines bending strain and torsion, either through a flexible design of the lever or through increasing the amount of bending strain. The combination of bending strain and torsion results in the availability of several parameters according to which the desired spring characteristic can be adjusted to meet requirements.

The spring section may possess the form of a torsion web, whereby the width of the torsion web corresponds to approximately the material thickness. Both ends of the torsion web are firmly connected with the armature and the lever is arranged in the middle of the torsion web. Due to the form and arrangement of the lever or the thrust bearing, the force generated by the armature spring can be optimally divided into bias force and armature bearing force.

DETAILED DESCRIPTION OF THE PREFERRED EMBODIMENT

Figure 1:
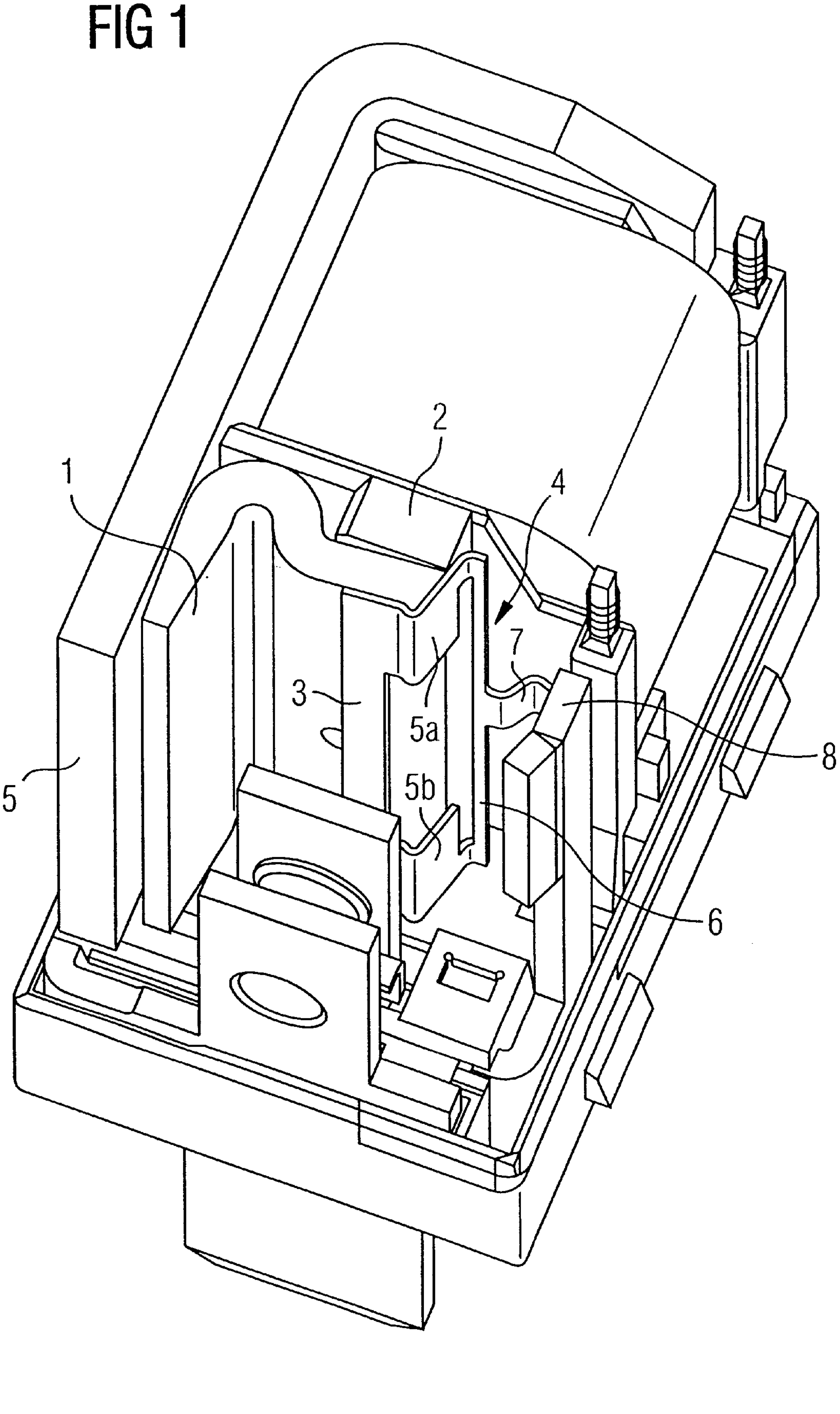
FIG. 1 represents a three-dimensional view of a relay comprising an armature spring according to the invention.

FIG. 1 shows a relay comprising an armature 1 with a rotary angle of approximately 12°. The armature pivot axis is thereby located on a pole face of a core 2. The armature 1 is positioned on the pole face, but can however still be shifted without additional measures. An armature spring 4 is attached to the side of the armature 1 opposite the pole face by means of a fastening section 3. The armature spring 4 is bent off on one edge of the armature 1, subsequently extending along the narrow edge of the armature 1 and making contact with the core 2 close to the armature pivot axis. In this area, the armature spring 4 is adjacent to the armature 1 as well as the core 2, so that the armature 1 cannot slip in the direction of a yoke 5 forming a second pole face. The armature spring 4 is formed in such a way that the fastening section 3 extends along the entire width of the armature 1. The section extending along the narrow armature edge and the core 2, however, comprises two legs **5*a* and 5*b*. A torsion web 6 extends between the ends of the legs 5*a* and 5*b* of the armature spring 4. The torsion web 6 extends essentially parallel to the armature pivot axis. In the middle of the torsion web 6, a lever 7 is arranged, which is supported at its free end 10 on a thrust bearing 8. The force transmission thus passes from the thrust bearing 8 via the lever 7, the torsion web 6 and the legs 5*a* and 5*b* of the armature spring 4 to the armature 1**.

Figure 2:
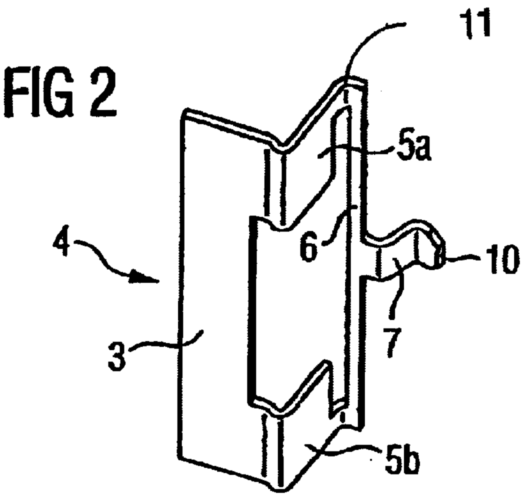
FIG. 2 represents the armature spring of the relay shown in FIG. 1.

FIG. 2 shows the armature spring 4 so that the entire lever 7 can be seen. In this embodiment the lever 7 is not rigid, but a flexible deformable element. The spring force of the armature spring 4 can thus be composed of two components, the tension of the torsion web 6 and the bending spring force of the lever 7. The degree of bending strain and torsion can be freely chosen so that the desired spring characteristic can be easily adjusted in accordance with requirements. The geometric shape of the lever 7 is selected so that the force can be transmitted from the thrust bearing 8 to the torsion web 6 in such a manner that the remaining bending stress on the torsion web 6 is as low as possible. Bending of the torsion web 6 is to be avoided as it is intended to be subject to torsion, not bending. If the torsion web 7 is nevertheless strained with a bending force, this rapidly leads to excessive loading of the torsion web. If the latter is strained only with one torsion, the torsion web can have a very narrow design. In an advantageous embodiment, the width of the torsion web 6 corresponds to approximately the thickness of the material. If a bending stress is unavoidable or the torsion web 6 is to be protected against such, the possibility exists of significantly increasing the flexural strength by means of a bending edge 11 in the longitudinal direction of the web 6, without any significant deterioration of the torsion characteristics.

When taking into consideration space economy, an armature spring according to the invention has particular advantages, especially if an even spring characteristic curve is desired. An even spring characteristic curve can typically be achieved through the spring being very long and/or very thin. A great length is of a disadvantage once again when considering space economy; an extremely thin leaf spring on the other hand exhibits unfavorable mechanical properties. In comparison, torsion springs have the advantage that the stress is evenly distributed over the entire length of the torsion web 6, in addition to achieving a sufficiently even characteristic curve.

The demand for an even spring characteristic curve has a background, which can be described only upon consideration of the entire relay, in which the armature spring 3 is mounted. As a rule, a contact spring is connected to the armature 2, whereby the contact spring comprises a switching contact, which interacts with a fixed contact. In this context it becomes clear that in the opened state of the armature, in which the latter is biased by the armature spring, the force exerted by the spring is to be as high as possible. When the magnet system has been excited and once the contacts are open, however, the spring force is to be as low as possible, to achieve as low an energy expenditure as possible for the opening of the contacts. A torsion spring as armature spring has the advantage in this case that the force progression is generally linear and exhibits a comparatively low build-up, whereas in the case of a leaf spring the force progression exhibits a relatively high build-up.

Figure 3:
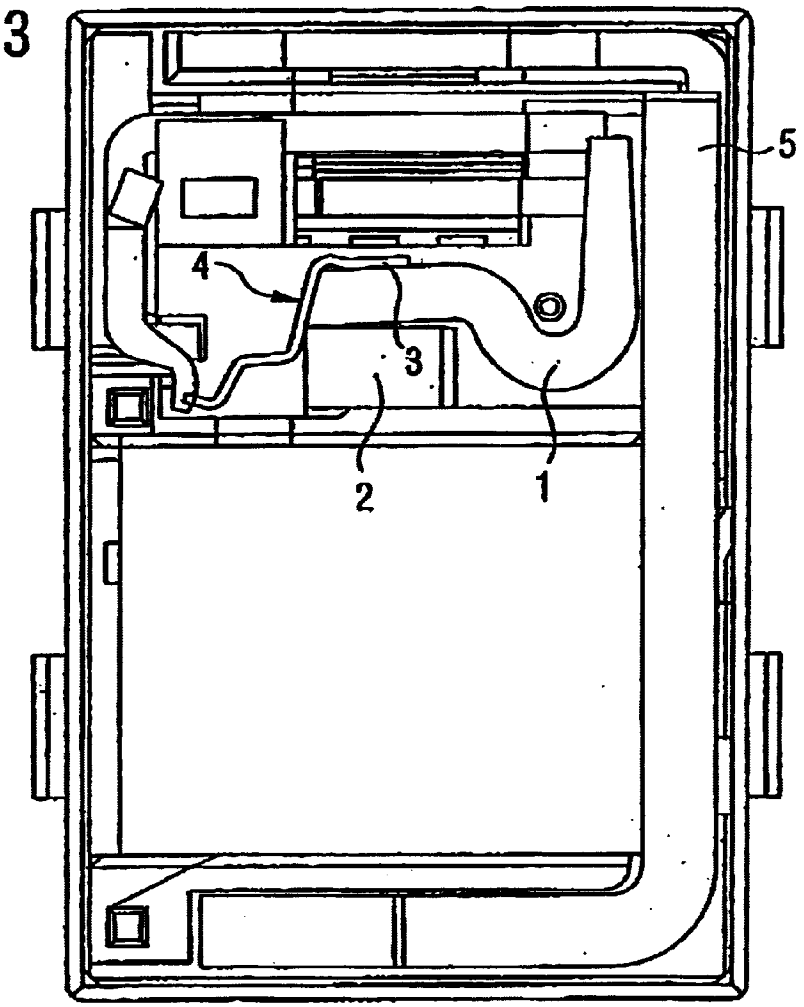
FIG. 3 represents a cross section of the relay shown in FIG. 1.

FIG. 3 shows a cross section of the relay. The fastening of the armature spring 4 to the armature 1 is particularly easily recognisable. In particular, it shows clearly how the position of the armature 1 on the core 2 is determined by the armature spring 4. The armature 1 is inclined to the armature side adjacent to the armature pivot axis so that in the closed state of the armature 1 a wedge-shaped gap remains between the armature spring 4 and the core. As a result, the armature 1 can freely pivot into the opened position, without the armature spring 4 abutting the side face of the core 2. The armature 1 is nevertheless safeguarded against slipping in the direction of the yoke 5.

What is claimed is:

1. A relay comprising:

an armature positioned adjacent to a core;

an armature spring having a first end fastened to the armature and a second end supported on a bearing; and the armature spring having a torsion web positioned between the first end and the second end that extends substantially parallel to a pivot axis of the armature, the pivot axis of the armature is located on a face of the core.

2. The armature spring according to claim 1, wherein the width of the torsion web corresponds to the thickness of the material out of which the armature spring is made.

3. The armature spring according to claim 1, wherein the torsion web also carries out a bending movement and the torsion web comprises a bending edge extending in a longitudinal direction, whereby the flexural strength of the torsion web is increased.

4. The armature spring according to claim 1, characterised in that a lever is attached in the middle of the torsion web, and both ends of the torsion web are connected to a fastening section.

5. The armature spring according to claim 1, wherein a spring movement of the support area of the armature spring with relation to the fastening end can be realised with a spring angle of 10° to 15°.

6. The armature spring according to claim 1, wherein a fastening section is attached to the armature by welding or riveting.

7. The relay of claim 1, wherein the second end has a flexibly deformable lever that extends from the torsion web to contact the bearing.

8. The relay of claim 7, wherein the lever is arranged in substantially the middle of the torsion web.

9. The relay of claim 1, wherein the armature spring contacts the core proximate the pivot axis.

10. The relay of claim 1, further comprising legs that attach the torsion web to the first end.

* * * * *